United States Patent [19]

Fukui et al.

[11] Patent Number: 5,100,930
[45] Date of Patent: * Mar. 31, 1992

[54] FOOD CONTAINER

[75] Inventors: Yoshiharu Fukui; Kazuhisa Kuroda, both of Ichihara, Japan

[73] Assignee: Sumitomo Chemical Company, Limited, Osaka, Japan

[*] Notice: The portion of the term of this patent subsequent to Jan. 15, 2008 has been disclaimed.

[21] Appl. No.: 544,978

[22] Filed: Jun. 28, 1990

[30] Foreign Application Priority Data

Jul. 7, 1989 [JP] Japan .................................. 1-176763
Jul. 7, 1989 [JP] Japan .................................. 1-176764

[51] Int. Cl.$^5$ .................................................. C08L 67/02
[52] U.S. Cl. ...................................... 523/100; 524/101; 524/108; 524/110; 524/220; 524/229; 524/232; 524/238; 524/291; 524/321
[58] Field of Search ............... 524/108, 110, 101, 229, 524/232, 238, 220, 324, 291; 523/100

[56] References Cited

U.S. PATENT DOCUMENTS 2,938,879  5/1960  Mock et al.
4,080,359  3/1978  Yui et al. ......................... 260/42.45
4,839,488  6/1989  Fukui et al. ......................... 524/100
4,963,605  10/1990  Fukui et al. ......................... 524/108
4,985,480  1/1991  Fukui et al. ......................... 524/108

FOREIGN PATENT DOCUMENTS

63-179943  7/1988  Japan .

*Primary Examiner*—Paul R. Michl
*Assistant Examiner*—John J. Guarriello
*Attorney, Agent, or Firm*—Birch, Stewart, Kolasch & Birch

[57] ABSTRACT

Disclosed herein is a food container of a resin composition composed of a polyolefin and an inorganic filler, said resin composition containing (i) a phenolic antioxidant and (ii) a slip agent and/or antistatic agent, said phenolic antioxidant being at least one kind selected from β-(4-hydroxy-3-t-butyl-5-alkylphenyl)propionic acid esters, hindered phenols having an isocyanuric acid ester, 1,3,5-tris(3,5-di-t-butyl-4-hydroxybenzyl)-2,4,6-trimethylbenzene, specific phenol compounds, and 6-hydroxychroman compounds. The food container has a low level of offensive odors and discoloration.

10 Claims, 5 Drawing Sheets

FOOD CONTAINER

BACKGROUND OF THE INVENTION

1. Field of the Invention

The present invention relates to a food container made of a polyolefin resin composition having a low level of offensive odors and discoloration.

2. Description of Related Art

It is a common practice to incorporate a polyolefin with an inorganic filler for the improvement of its stiffness, impact resistance, heat resistance, etc., and some of the filled polyolefins find use as food containers. However, the filled polyolefin poses problems when used for food packaging because of its offensive odors, undesirable color, and decreased heat resistance. The offensive odors are noticeable especially when a full food container is sterilized at a high temperature or heated for cooking in a microwave oven. For this reason, there have been proposed several methods for eliminating offensive odors from food containers of polyolefin resin composition. For example, Japanese Patent Laid-open No. 179943/1988 discloses a food container made of a resin composition composed of (1) 100 parts by weight of a composition composed of 90-20 wt % of polyolefin resin and 10-80 wt % of talc and/or calcium carbonate and (2) 0.05-5 parts by weight of an antistatic agent (such as a polyhydric alcohol ester of fatty acid) and/or a slip agent (such as an unsaturated fatty acid amide). The food container, however, is still unsuccessful in the complete elimination of offensive odors and discoloration.

In order to overcome the above-mentioned disadvantages involved in the prior art technology, the present inventors carried out a series of researches which led to a finding that a food container having a low level of offensive odors and discoloration can be obtained from a polyolefin resin composition incorporated with an inorganic filler and a specific phenolic antioxidant and a slip agent and/or antistatic agent.

The investigation by the present inventors revealed that a food container made of a polyolefin composition incorporated with an inorganic filler and an antioxidant gives off offensive odors and becomes discolored when the composition undergoes high-temperature mixing or thermoforming or when the food container is heated. The offensive odors and discoloration result from the reaction of the inorganic filler with the polyolefin and/or antioxidant, which deteriorates the polyolefin and/or decomposes the antioxidant.

As the result of the investigation, it was found that it is possible to eliminate the offensive odors and discoloration almost completely form the food container, if the polyolefin composition is incorporated with (1) a specific high-performance phenolic antioxidant which prevents the deterioration of polyolefins and hardly reacts with inorganic fillers, or gives off no offensive odors even when decomposed, and (2) a specific compound which suppresses the reaction of the phenolic antioxidant with the inorganic filler. This finding is the basis on which the present invention was completed.

SUMMARY OF THE INVENTION

It is an object of the present invention to provide a food container of a resin composition composed of a polyolefin and an inorganic filler, said resin composition containing (i) a phenolic antioxidant and (ii) a slip agent and/or antistatic agent, said phenolic antioxidant being at least one kind selected from $\beta$-(4-hydroxy-3-t-butyl-5-alkylphenyl)propionic acid esters, hindered phenols having an isocyanuric acid ester, 1,3,5-tris(3,5-di-t-butyl-4-hydroxybenzyl)-2,4,6-trimethylbenzene, phenol compounds represented by the formula (I) below, (where $R_1$ denotes a $C_{1-3}$ alkyl group.) and 6-hydroxychroman compounds represented by the formula (II) below (where $R_2$, $R_3$, and $R_4$ each independently denotes a hydrogen atom or $C_{1-4}$ alkyl group of the same or different kind; and $R_5$ denotes a $C_{1-16}$ alkyl group or alkylene group.)

DETAILED DESCRIPTION OF THE INVENTION

The invention will be explained in more detail in the following.

The polyolefin used in the present invention is a homopolymer or a random or block copolymer of $\alpha$-olefin such as ethylene, propylene, butene-1, hexene-1, and 4-methyl-pentene-1. Examples of the polyolefin include polyethylene, polypropylene, polybutene-1, polyisobutene, poly-3-methyl-butene-1, poly-4-methyl-pentene-1, ethylene-propylene copolymer, ethylene-butene-1 copolymer, propylene-4-methyl-pentene-1 copolymer, propylene-butene-1 copolymer, ethylene-propylene-butene-1 copolymer, and decene-1-4-methyl-pentene-1 copolymer. They may be used alone or in combination with one another. They may also be used in combination with a synthetic rubber according as applications.

The inorganic filler used in the present invention includes, for example, talc, mica, wollastonite, calcium carbonate, barium sulfate, magnesium carbonate, alumina, silica, synthetic zeolite, glass fiber, carbon black, titanium oxide, magnesium hydroxide, and zeolite. They may be used alone or in combination with one another. Preferable among them are talc, mica, calcium carbonate, glass fiber, and wollastonite. Most desirable among them is talc.

The inorganic filler should be used in an amount of 1-120 parts by weight, preferably 5-100 parts by weight, for 100 parts by weight of polyolefin. With an amount less than 1 part by weight, the inorganic filler does not impart the desired mechanical properties and heat resistance to the resin composition. With an amount in excess of 120 parts by weight, the inorganic filler makes the resin composition unsuitable for the production of thick-walled containers because of poor thermoformability.

The specific phenolic antioxidant used in the present invention is at least one kind selected from β-(4-hydroxy-3-t-butyl-5-alkylphenyl)propionic acid esters, hindered phenols having an isocyanuric acid ester, 1,3,5-tris(3,5-di-t-butyl-4-hydroxybenzyl)-2,4,6-trimethylbenzene, phenol compounds represented by the formula (I) below, (where $R_1$ denotes a $C_{1-3}$ alkyl group.) and 6-hydroxychroman compounds represented by the formula (II) below (where $R_2$, $R_3$, and $R_4$ each independently denotes a hydrogen atom or a $C_{1-4}$ alkyl group of the same or different kind; and $R_5$ denotes a $C_{1-16}$ alkyl group or alkylene group.)

Preferred examples of the phenol compound used in the present invention include the following.

tetrakis[methylene-3-(3,5-di-t-butyl-4-hydroxyphenyl)-propionate]methane,
octadecyl-3-(3,5-di-t-butyl-4-hydroxyphenyl)propionate, 1,3,5-tris(3,5-di-t-butyl-4-hydroxybenzyl)-2,4,6-trimethylbenzene,
tris(3,5-di-t-butyl-4-hydroxybenzyl)isocyanurate, triethyleneglycol-bis[3-(3-t-butyl-5-methyl-4-hydroxyphenyl)propionate], and
3,9-bis[2-[3-(3-t-butyl-4-hydroxy-5-methylphenyl)-propionyloxy]-1,1-dimethylethyl]-2,4,8,10-tetraoxaspiro[5.5]undecane.

Examples of the 6-hydroxychroman compounds used in the present invention include the following. α-, β-, γ-, δ-, ε-, ζ-, and η-tocopherols and mixtures thereof, 2,5-dimethyl substitution product, 2,5,8-trimethyl substitution product, and 2,5,7,8-tetramethyl substitution product of 2-(4-methyl-penta-3-enyl)-6-hydroxychroman, 2,2,7-trimethyl-5-t-butyl-6-hydroxychroman, 2,2,5-trimethyl-7-t-butyl-6-hydroxychroman, 2,2,5-trimethyl-6-t-butyl-6-hydroxychroman, and 2,2-dimethyl-5-t-butyl-6-hydroxychroman. Preferable among them are tocopherols and mixtures thereof.

According to the present invention, the phenolic antioxidant should be used in an amount of 0.01-2.0 parts by weight, preferably 0.03-1.0 part by weight, for 100 parts by weight of polyolefin. With an amount in excess of 2.0 parts by weight, the phenolic antioxidant produces adverse effects, such as fuming at the time of molding and bleeding to the container surface. Moreover, using an excess amount of phenolic antioxidant is uneconomical. With an amount less than 0.01 part by weight, the phenolic antioxidant does not produce the desired effect of the present invention.

According to the present invention, the resin composition is incorporated with a slip agent and/or antistatic agent to suppress the reaction between the inorganic filler and the specific phenolic antioxidant.

The slip agent used in the present invention includes those compounds represented by the formulas (III) and (IV) below.

(where $R_6$ denotes a $C_{5-21}$ alkyl group or alkenyl group; and l denotes 1 to 6.)

(where $R_7$ denotes a $C_{5-21}$ alkyl group or alkenyl group.)

Preferred examples of the slip agent include methylene-bis-stearamide, ethylene-bis-stearamide, ethylene-bis-oleamide, hexamethylene-bis-stearamide, lauramide, stearamide, oleamide, behenamide, and erucamide. Most desirable among them are saturated fatty acid amides.

The antistatic agent used in the present invention include those compounds represented by the formulas (V) and/or (VI) below, and it also includes lower alcohol esters of fatty acid (VII) and polyhydric alcohol esters of fatty acid (VIII).

(where $R_8$ denotes a $C_{8-18}$ alkyl group, alkenyl group, or acyl group (R'—CO) (R' in the acyl group may be an unsaturated aliphatic carbon chain); m and n are integers defined by m+n=2 to 10; and $R_9$ denotes a $C_{7-17}$ alkyl group or alkenyl group.)

Preferred examples of the antistatic agent are listed below.

-continued

According to the present invention, the slip agent and/or antistatic agent should be used in an amount of 0.01–5.0 parts by weight, preferably 0.05–2.0 parts by weight, for 100 parts by weight of the inorganic filler. With an amount in excess of 5.0 parts by weight, the slip agent and/or antistatic agent may give off more offensive odors. Moreover, using the slip agent and/or antistatic agent in an excess amount is uneconomical. With an amount less than 0.01 part by weight, the slip agent and/or antistatic agent does not produce the desired effect of the present invention.

The resin composition of the present invention may be incorporated with a phosphorous antioxidant for the improvement of processing stability and thermal-oxidative stability. Examples of the phosphorous antioxidant are listed below.

distearyl pentaerythritol diphosphite,
tris(2,4-di-t-butylphenyl) phosphite,
bis(2,4-di-t-butylphenyl)pentaerythritol diphosphite,
tetrakis(2,4-di-t-butylphenyl)-4,4'-diphenyldiphosphonite, and trinonylphenyl phosphite.

The phosphorous antioxidant should be used in an amount of 0.01–1.0 part by weight, preferably 0.03–0.5 part by weight, for 100 parts by weight of the polyolefin.

The resin composition of the present invention may be incorporated with other additives such as neutralizing agent, antioxidant, light stabilizer, UV light absorber, heavy metal deactivator, plasticizer, nucleating agent, antiblocking agent, pigment (including titania), blowing agent, and mildewproofing agent, so long as they have no adverse effects on the feature of the present invention.

The food container of the present invention may be produced in the same manner as ordinary plastics containers. A common method consists of mixing a polyolefin powder with an inorganic filler, phenolic antioxidant, and slip agent and/or antistatic agent using a Henschel mixer or the like, mixing and pelletizing the mixture using an extruder or Banbury mixer, extruding the pellets into a sheet using a T-die extruder, and thermoforming the sheet into a desired shape. An alternative method consists of forming the pellets directly into containers by injection molding. Another possible method consists of forming a sheet from pellets containing a blowing agent, expanding the sheet 1.1–20 times, and thermoforming the expanded sheet into containers. Incidentally, the sheet for thermoforming may be replaced by a coextruded multi-layer sheet composed of a layer of the polyolefin resin composition, a layer of polyvinylidene chloride, and a layer of polypropylene or the polyolefin resin composition.

EXAMPLES

The invention will be described with reference to the following examples and comparative examples, which are not intended to restrict the scope of the invention.

EXAMPLE 1

A resin composition was prepared by mixing the following components in a Henschel mixer.
60 parts by weight of homopolypropylene in powder form (having a melt flow index of 0.8 g/10 min),
40 parts by weight of talc,
0.2 part by weight of tetrakis[methylene-3-(3,5-di-t-butyl-4-hydroxyphenyl)propionate]methane ("Sumilizer BP-101"),
0.15 part by weight of glycerin monostearate, and
0.05 part by weight of calcium stearate.

The mixture was pelletized using an extruder at 250° C., and the pellets were extruded into a 0.6-mm thick sheet using a T-die extruder. The sheet was thermoformed into a container, 16 cm long, 10 cm wide, and 2.5 cm deep.

The container was cut into small pieces (several millimeters square). The small pieces (10 g) were placed in a 200-ml stoppered glass bottle. The bottle was heated in an oven at 150° C. for 10 minutes, followed by conditioning at 60° C. for 30 minutes. Immediately after removal from the oven, the bottle was opened and the air therein was tested for offensive odors.

The intensity of offensive odors was rated in five ranks (1 to 5) by five panelists according to the following criterion. The container was rated at 2.4 in terms of an average of five values.

1: very weak (hardly smells)
2: weak (slightly smells)
3: medium (apparently smells)
4: strong (strongly smells)
5: very strong (intolerably smells)

The cut pieces of the container were taken out from the glass bottle and they were tested for yellowness index according to JIS K7103. A YI value of 5 was obtained. The smaller the YI value, the better the color.

The food container was also tested for the volatile components it gives off when heated at 150° C. The test was carried out in the following manner using a full automatic head space analyzing system consisting of a gas chromatograph (GC-9APF) and head space sampler (HSS-2A), both made by Shimadzu Seisakusho, Ltd.

(1) The sample container was cut into small pieces (several millimeters square), and the cut pieces (0.5 g) were placed in a 20-ml glass bottle (via) under a nitrogen stream. The glass bottle was set on the head space sampler.

(2) The glass bottle was heated at 150° C. for 60 minutes, and then a sample gas (0.8 ml) was taken from the glass bottle.

(3) The sample gas was analyzed by gas chromatography under the following conditions.

Figure 1:
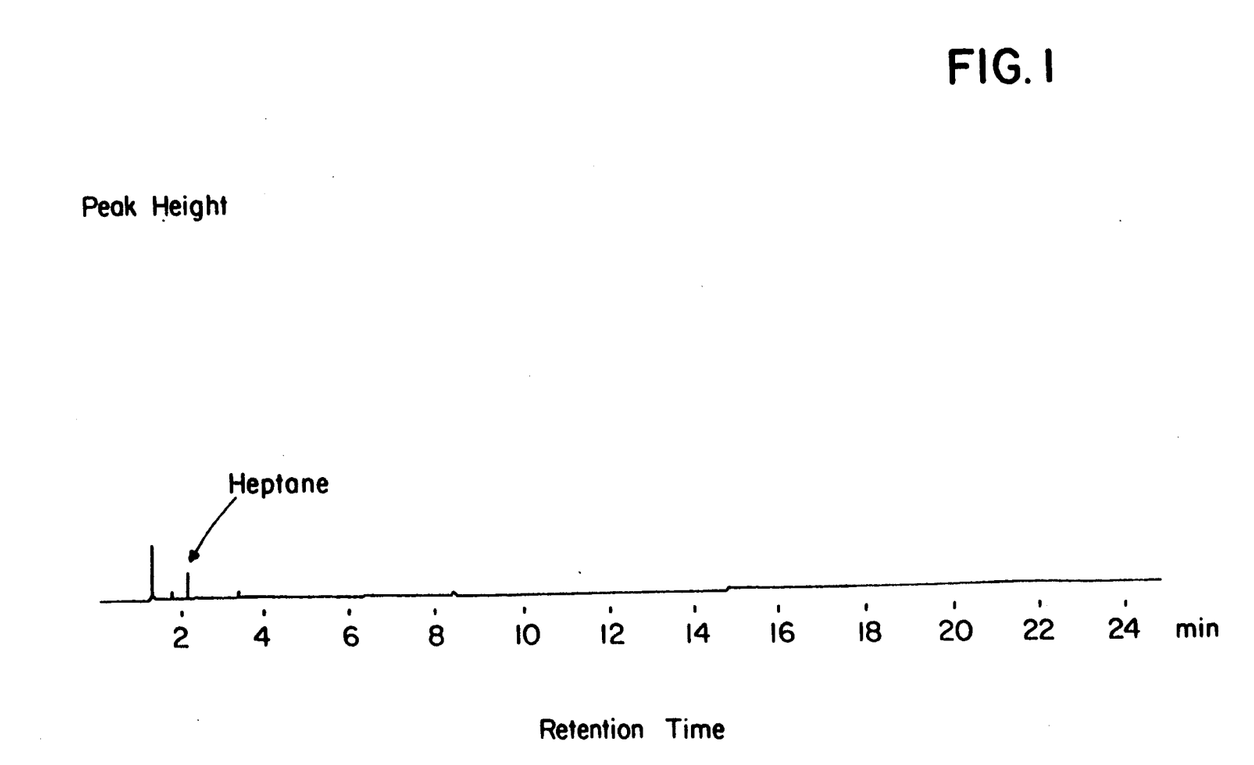
FIG. 1 is a gas chromatogram pertaining to Example 1 of the present invention.

Column: HiCap-CBP1 (0.25 mm in inside diameter, 25 m long, made by Shimadzu Seisakusho, Ltd.)
Column temperature: 60° C. to 230° C. raised at a rate of 5° C./min (temperature-programmed chromatography)
Injection temperature: 300° C.
Detection temperature: 300° C.
Carrier gas: He The results of measurement are shown in FIG. 1. It is noted that volatile components (decomposition components) were hardly detected.

COMPARATIVE EXAMPLE 1

Figure 2:
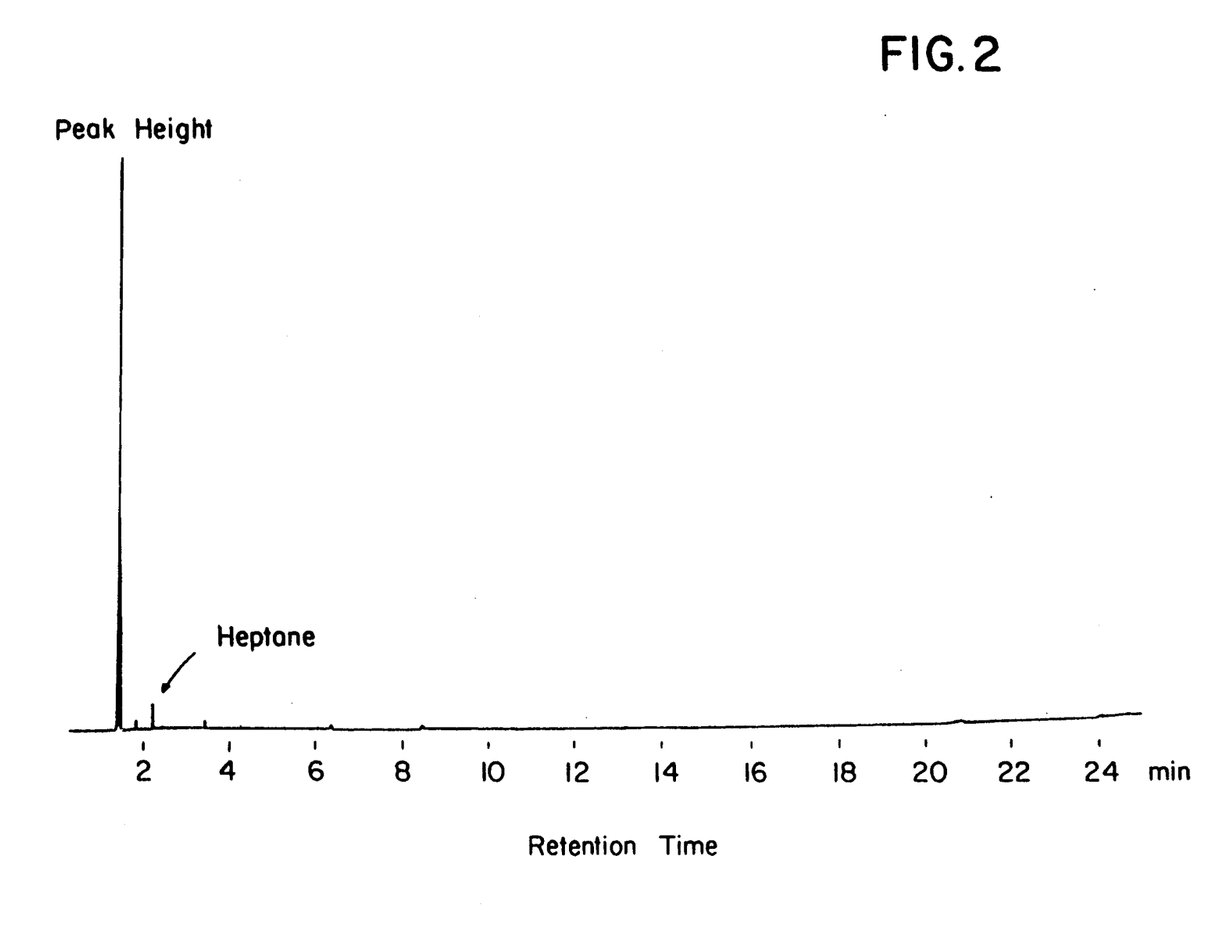
FIG. 2 is a gas chromatogram pertaining to Comparative Example 1 of the present invention.

The same procedure as in Example 1 was repeated except that the resin composition was not incorporated with glycerin monostearate. The results are shown in Table 1. The resulting container was tested for volatile components. A large amount of volatile components (decomposition components) was detected as shown in FIG. 2. This corresponds well to the high intensity of offensive odors.

COMPARATIVE EXAMPLE 2

The same procedure as in Example 1 was repeated except that tetrakis[methylene-3-(3,5-di-t-butyl-4-hydroxyphenyl)propionate]methane was replaced by 2,6-di-t-butyl-4-methylphenol ("Sumilizer BHT" made by Sumitomo Chemical Co., Ltd.). The results are shown in Table 1.

Figure 3:
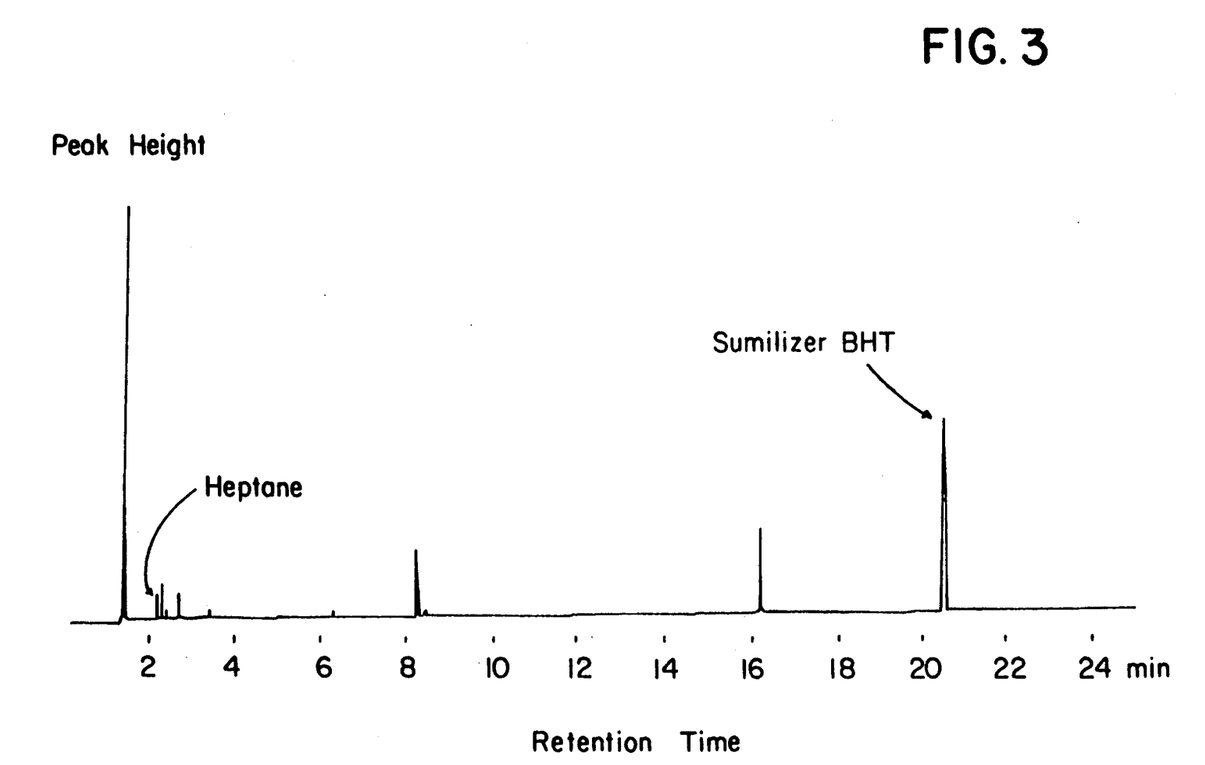
FIG. 3 is a gas chromatogram pertaining to Comparative Example 2 of the present invention.

The resulting container was tested for volatile components. A large amount of volatile components (decomposition components) was detected as shown in FIG. 3. This corresponds well to the high intensity of offensive odors.

COMPARATIVE EXAMPLE 3

Figure 4:
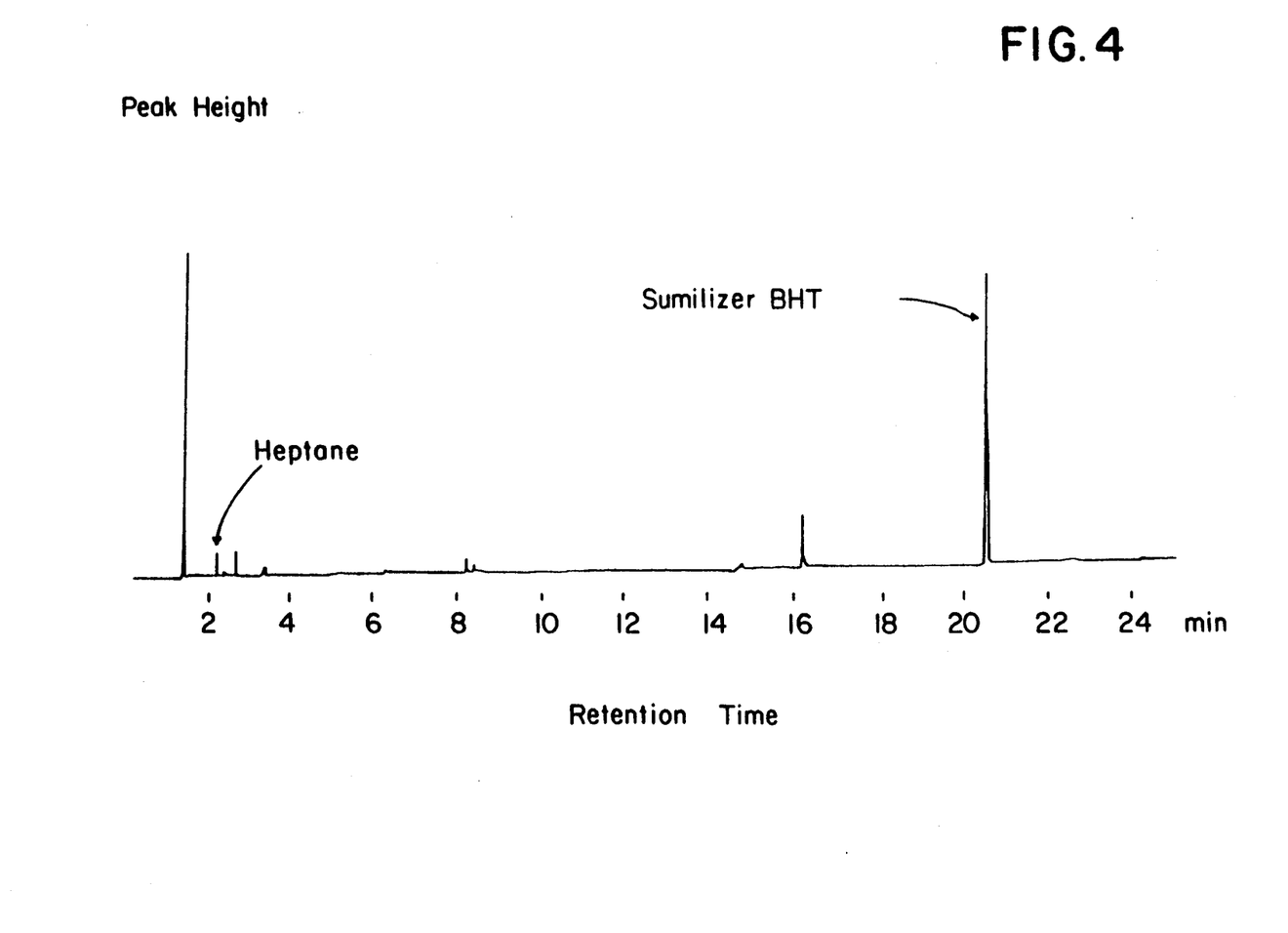
FIG. 4 is a gas chromatogram pertaining to Comparative Example 3 of the present invention.

The same procedure as in Example 1 was repeated except that 0.2 part by weight of tetrakis[methylene-3-(3,5-di-t-butyl-4-hydroxyphenyl)propionate]methane was replaced by 0.1 part by weight each of tetrakis[methylene-3-(3,5-di-t-butyl-4-hydroxyphenyl)propionate]methane and 2,6-di-t-butyl-4-methylphenol. The results are shown in Table 1. The resulting container was tested for volatile components. A large amount of volatile components (decomposition components) was detected as shown in FIG. 4. This corresponds well to the high intensity of offensive odors.

EXAMPLE 2

Figure 5:
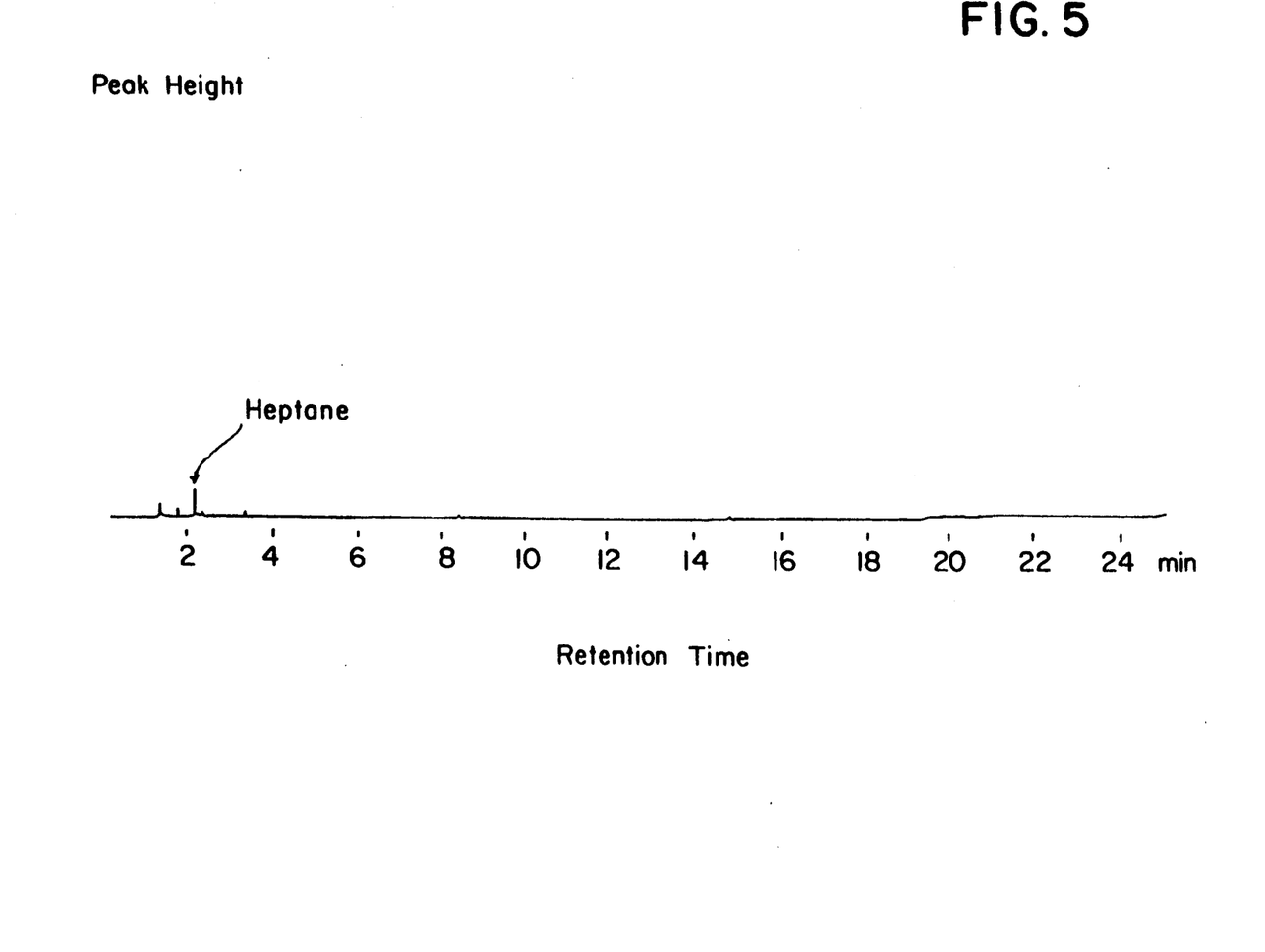
FIG. 5 is a gas chromatogram pertaining to Example 4 of the present invention.

The same procedure as in Example 1 was repeated except that glycerin monostearate was replaced by ethylene-bis-stearamide. The results are shown in Table 1. The resulting container was tested for volatile components. Volatile components were hardly detected as shown in FIG. 5.

EXAMPLE 3

The same procedure as in Example 1 was repeated except that the resin composition was prepared from the following components.
80 parts by weight of homopolypropylene in powder form,
20 parts by weight of talc,
0.2 part by weight of tris-(3,5-di-t-butyl-4-hydroxybenzyl)isocyanurate,
0.1 part by weight of ethylene-bis-stearmide, and 0.05 part by weight of calcium stearate.

The results are shown in Table 1.

EXAMPLES 4 to 6

The same procedure as in Example 3 was repeated except that the slip agent and antistatic agent were replaced by those of different kind. The results are shown in Table 1.

EXAMPLES 7 and 8

The same procedure as in Example 3 was repeated except that the phenolic antioxidant was replaced by that of different kind. The results are shown in Table 1.

EXAMPLE 9

The same procedure as in Example 3 was repeated except that the talc was replaced by calcium carbonate. The results are shown in Table 1.

COMPARATIVE EXAMPLE 4

The same procedure as in Example 3 was repeated except that the resin composition was not incorporated with ethylene-bis-stearamide. The results are shown in Table 1.

EXAMPLE 10

A resin composition was prepared by mixing the following components in a Henschel mixer.
60 parts by weight of homopolypropylene in powder form (having a melt flow index of 0.8 g/10 min),
40 parts by weight of talc,
0.05 part by weight of dl-$\alpha$-tocopherol,
0.15 part by weight of glycerin monostearate, and
0.05 part by weight of calcium stearate.

The mixture underwent the same steps as in Example 1, and the resulting container was tested for offensive odors. The intensity of offensive odors was rated at 2.6.

COMPARATIVE EXAMPLE 5

The same procedure as in Example 10 was repeated except that the resin composition was not incorporated with glycerin monostearate. The results are shown in Table 2.

COMPARATIVE EXAMPLE 6

The same procedure as in Example 10 was repeated except that dl-$\alpha$-tocopherol was replaced by 2,6-di-t-butyl-4-methylphenol. The results are shown in Table 2.

EXAMPLES 11 to 14

The same procedure as in Example 10 was repeated except that the slip agent and antistatic agent were replaced by those of different kind. The results are shown in Table 2.

COMPARATIVE EXAMPLE 7

The same procedure as in Example 10 was repeated except that dl-α-tocopherol was replaced by 2,6-di-t-butyl-4-methylphenol and tetrakis-[methylene-3-(3,5-di-t-butyl-4-hydroxyphenyl)propionate]-methane. The results are shown in Table 2.

It is noted from Tables 1 and 2 that the food container of the present invention is almost free of offensive odors and discoloration when it is made of a polyolefin resin composition incorporated with an inorganic filler, a specific phenolic antioxidant, and a slip agent and/or antistatic agent. The food container is suitable for sterilization at a high temperature or for heating in a microwave oven.

What is claimed is:

1. A food container of a resin composition composed of 100 parts by weight of a polyolefin and 1-120 parts by weight of an inorganic filler, said resin composition containing (i) 0.01-2.0 parts by weight of a phenolic antioxidant per 100 parts by weight of said polyolefin and (ii) 0.01-5.0 parts by weight of a slip agent and/or an antistatic agent per 100 parts by weight of said inorganic filler; said phenolic antioxidant being at least one kind selected from the group consisting of β-(4-hydroxy-3-t-butyl-5-alkylphenyl)-propionic acid esters, hindered phenols having an isocyanuric acid ester, 1,3,5-tris-(3,5-di-t-butyl-4-hydroxybenzyl)-2,4,6-trimethylbenzene, phenol compounds represented by the formula (I) below,

TABLE 1

| Example No. (Comparative Example No.) | Resin composition (parts by weight) | | | | | | | | | Offensive odors*2 | YI value of container |
|---|---|---|---|---|---|---|---|---|---|---|---|
| | Polyolefin | | Inorganic filler | | Phenolic antioxidant | | Slip or antistatic agent | | | | |
| | Kind | Amount added | Kind | Amount added | Kind | Amount added | Kind | Amount added | | | |
| 1 | PP*1 | 60 | Talc | 40 | A-1 | 0.2 | B-1 | 0.10 | | 2.4 | 5 |
| 2 | PP | 60 | Talc | 40 | A-1 | 0.2 | B-2 | 0.10 | | 2.0 | 0 |
| 3 | PP | 80 | Talc | 20 | A-2 | 0.2 | B-2 | 0.10 | | 1.4 | −8 |
| 4 | PP | 80 | Talc | 20 | A-2 | 0.2 | B-3 | 0.10 | | 1.6 | −6 |
| 5 | PP | 80 | Talc | 20 | A-2 | 0.2 | B-4 | 0.10 | | 1.4 | −8 |
| 6 | PP | 80 | Talc | 20 | A-2 | 0.2 | B-5 | 0.10 | | 1.6 | −6 |
| 7 | PP | 80 | Talc | 20 | A-3 | 0.2 | B-2 | 0.10 | | 1.4 | −8 |
| 8 | PP | 80 | Talc | 20 | A-4 | 0.2 | B-2 | 0.10 | | 1.4 | −10 |
| 9 | PP | 80 | CaCO₃ | 20 | A-2 | 0.2 | B-2 | 0.10 | | 1.2 | −12 |
| (1) | PP | 60 | Talc | 40 | A-1 | 0.2 | — | — | | 4.0 | 15 |
| (2) | PP | 60 | Talc | 40 | A-5 | 0.2 | B-1 | 0.10 | | 4.8 | 10 |
| (3) | PP | 60 | Talc | 40 | A-1 | 0.1 | B-1 | 0.10 | | 4.4 | 8 |
| | | | | | A-5 | 0.1 | | | | | |
| (4) | PP | 80 | Talc | 20 | A-2 | 0.2 | — | — | | 3.8 | 1 |

Note to Table 1
*1Polypropylene
*2An average value of the intensity of offensive odors the container gives off.
A-1: tetrakis[methylene-3-(3,5-di-t-butyl-4-hydroxyphenyl)propionate]methane
A-2: tris(3,5-di-t-butyl-4-hydroxybenzyl)isocyanurate. ("Irganox 1330")
A-3: 1,3,5-tris(3,5-di-t-butyl-4-hydroxybenzyl)-2,4,6-trimethylbenzene ("Irganox 3114")
A-4: 3,9-bis[2-[3-(3-t-butyl-4-hydroxy-5-methylphenyl)-propionyloxy]-1,1-dimethylethyl]-2,4,8,10-tetraoxaspiro[5.5]undecane ("Sumilizer GA-80" made by Sumitomo Chemical Co., Ltd.)
A-5: 2,6-di-t-butyl-4-methylphenol ("Sumilizer BHT" made by Sumitomo Chemical Co., Ltd.)
B-1: glycerin monostearate
B-2: ethylene-bis-stearamide
B-3: erucamide
B-4: behenamide
B-5: stearyl diethanolamine monostearate

TABLE 2

| Example No. (Comparative Example No.) | Resin composition (parts by weight) | | | | | | | | Offensive odors*2 |
|---|---|---|---|---|---|---|---|---|---|
| | Polyolefin | | Inorganic filler | | Phenolic antioxidant | | Slip or antistatic agent | | |
| | Kind | Amount added | Kind | Amount added | Kind | Amount added | Kind | Amount added | |
| 10 | PP*1 | 60 | Talc | 40 | A-6 | 0.05 | B-1 | 0.10 | 2.6 |
| 11 | PP | 60 | Talc | 40 | A-6 | 0.05 | B-2 | 0.10 | 2.2 |
| 12 | PP | 60 | Talc | 40 | A-6 | 0.05 | B-3 | 0.10 | 2.4 |
| 13 | PP | 60 | Talc | 40 | A-6 | 0.05 | B-4 | 0.10 | 2.2 |
| 14 | PP | 60 | Talc | 40 | A-6 | 0.05 | B-5 | 0.10 | 2.4 |
| (5) | PP | 60 | Talc | 40 | A-6 | 0.05 | — | — | 4.0 |
| (6) | PP | 60 | Talc | 40 | A-5 | 0.05 | B-1 | 0.10 | 4.8 |
| (7) | PP | 60 | Talc | 40 | A-5 | 0.05 | B-1 | 0.10 | 4.6 |
| | | | | | A-1 | 0.05 | | | |

Note to Table 2
*1Polypropylene
*2An average value of the intensity of offensive odors the container gives off.
A-1: tetrakis[methylene-3-(3,5-di-t-butyl-4-hydroxyphenyl)propionate]methane
A-5: 2,6-di-t-butyl-4-methylphenol
A-6: dl-α-tocopherol
B-1: glycerin monostearate
B-2: ethylene-bis-stearamide
B-3: erucamide
B-4: behenamide
B-5: stearyl diethanolamine monostearate

(I)

where $R_1$ denotes a $C_{1-3}$ alkyl group, and 6-hydroxychroman compounds represented by the formula (II) below, (II)

where $R_2$, $R_3$, and $R_4$ each independently denotes a hydrogen atom or a $C_{1-4}$ alkyl group of the same or different kind; and $R_5$ denotes a $C_{1-16}$ alkyl group or alkylene group; said slip agent (ii) is one which is selected from compounds represented by the formulas (III) and (IV) below,

(III)

where $R_6$ denotes a $C_{5-21}$ alkyl group; and l denotes 1 to 6, and (IV)

where $R_7$ denotes a $C_{5-21}$ alkyl group; and said antistatic agent (ii) is one which is selected from compounds represented by the formula (VI) below, (VI)

where $R_8$ denotes an acyl group $R'$—CO, wherein $R'$ in said acyl group may be an unsaturated aliphatic carbon chain; m and n are integers defined by m+n=2 to 10; and $R_9$ denotes a $C_{7-17}$ alkyl group or alkenyl group.

2. A food container as claimed in claim 1, wherein said resin composition further contains 0.01–1.0 part by weight of a phosphorous antioxidant per 100 parts by weight of said polyolefin.

3. A food container as claimed in claim 1 or 2, wherein said polyolefin is a homopolymer or a random or block copolymer of α-olefins, a mixture thereof, or a mixture thereof in combination with a synthetic rubber.

4. A food container as claimed in claim 1 or 2, wherein said inorganic filler is at least one selected from the group consisting of talc, mica, wollastonite, calcium carbonate, barium sulfate, magnesium carbonate, alumina, silica, synthetic zeolite, glass fiber, carbon black, titanium oxide, magnesium hydroxide, and zeolite.

5. A food container as claimed in claim 1 or 2, wherein said β-(4-hydroxy-3-t-butyl-5-alkylphenyl)-propionic acid esters are selected from the group consisting of tetrakis[methylene-3-(3,5-di-t-butyl-4-hydroxyphenyl)-propionate]methane, octadecyl-β-(3,5-di-t-butyl-4-hydroxyphenyl)propionate, and triethyleneglycolbis[3-(3-t-butyl-5-methyl-4-hydroxy-phenyl)propionate].

6. A food container as claimed in claim 1 or 2, wherein said hindered phenol having an isocyanuric acid ester is tris(3,5-di-t-butyl-4-hydroxybenzyl)isocyanurate.

7. A food container as claimed in claim 1 or 2, wherein said phenol compound represented by the formula (I) is 3,9-bis[2-[3-(3-t-butyl-4-hydroxy-5-methylphenyl)-propionyloxy]-1,1-dimethylethyl]- 2,4,8,10-tetraoxaspiro-[5.5]undecane.

8. A food container as claimed in claim 1 or 2, wherein said 6-hydroxychroman compounds represented by the formula (II) are selected from the group consisting of α-, β-, γ-, δ-, ε-, ζ-, and η-tocopherols and mixtures thereof, 2,5-dimethyl substitution product, 2,5,8-trimethyl substitution product, and 2,5,7,8-tetramethyl substitution product of 2-(4-methyl-penta-3-enyl)-6-hydroxychroman, 2,2,7-trimethyl-5-t-butyl-6-hydroxychroman, 2,2,5-trimethyl-7-t-butyl-6-hydroxychroman, 2,2,5-trimethyl-6-t-butyl-6-hydroxychroman, and 2,2-dimethyl-5-t-butyl-6-hydroxychroman.

9. A food container as claimed in claim 1, wherein said slip agent (ii) is selected from the group consisting of methylene-bis-stearamide, ethylene-bis-stearamide, hexamethylene-bis-stearamide, laurylamide, stearylamide and behenamide.

10. A food container as claimed in claim 1, wherein said antistatic agent (ii) is selected from the group consisting of (1)

(2)

and (3)

* * * * *